United States Patent

Hemker et al.

[11] Patent Number: 5,956,662
[45] Date of Patent: Sep. 21, 1999

[54] METHOD FOR LOAD MEASUREMENT

[75] Inventors: Josef Hemker, Paderborn; Dirk Pfeifer, Büren, both of Germany

[73] Assignee: Siemens Nixdorf Informationssystem Aktiengesellschaft, Paderborn, Germany

[21] Appl. No.: 08/930,231
[22] PCT Filed: Jan. 22, 1996
[86] PCT No.: PCT/DE96/00086
  § 371 Date: Sep. 17, 1997
  § 102(e) Date: Sep. 17, 1997
[87] PCT Pub. No.: WO96/30835
  PCT Pub. Date: Oct. 3, 1996

[30] Foreign Application Priority Data

Mar. 27, 1995 [DE] Germany ............ 195 11 252

[51] Int. Cl.⁶ ..................................... G06F 19/00
[52] U.S. Cl. ............. 702/182; 702/186; 395/200.33; 395/200.54; 705/7
[58] Field of Search .................... 702/182, 108, 702/127, 186, 188; 395/200.31, 200.33, 200.47, 200.49, 200.5, 200.53, 200.54, 200.55, 200.56; 371/28; 364/149, 152, 153; 705/7, 8, 9

[56] References Cited

U.S. PATENT DOCUMENTS 5,440,719  8/1995  Hanes et al. ............ 395/500
5,539,883  7/1996  Allon et al. .......... 395/200.11
5,664,106  9/1997  Caccavale ........... 395/200.54
5,675,731  10/1997  Fuller ................ 395/183.14
5,691,920  11/1997  Levine et al. ......... 364/551.01
5,729,726  3/1998  Levine et al. ........... 395/580
5,742,819  4/1998  Caccavale ............... 396/615

OTHER PUBLICATIONS

Drakopoulos, "Analysis of a Local Computer Network with Workstations and X Terminals", IEEE., Mar. 1992.
Philips, "Prophesy Brings Solid Network Simulation on a Tight Budget", PC Week, Oct. 1994.
USENIX Association, Proceedings of the 6$^{TH}$ Systems Administration Conference, (LISA VI), Oct. 1992, H.L. Stern et al, "NFS Performance and Network Loading", pp. 33–38.
Proceedings of the Summer USENIX Conference, Jun. 1993, M. Wittle et al, "LADDIS: The Next Generation in NFS File Server Benchmarking", pp. 111–128.
Proceedings of the IEEE, vol. 81, No. 8, Aug. 1993, P.M. Chen et al, "Storage Performance–Metrics and Benchmarks", pp. 1151–1165.
Elektrisches Nachrichtenwesen, vol. 59, No. 1/2, (1985), G. Morales Andres et al, System 12 überlastabwehrstrategie, pp. 74–79.

Primary Examiner—Patrick Assouad
Attorney, Agent, or Firm—Hill & Simpson

[57] ABSTRACT

Method for operating computers for measuring the performance, a performance figure being determined from an overload by successively disconnecting a plurality of computers.

5 Claims, 1 Drawing Sheet

METHOD FOR LOAD MEASUREMENT

BACKGROUND OF THE INVENTION

The method relates to the operation of computer systems for measuring the performance in networked systems.

During the planning and installation of networked computer systems, it is expedient to evaluate or test the planned system in order to find out whether the planned system actually achieves the required performance. The number of instructions which can be executed per second by a central processing unit is for the most part inadequate for this purpose. Performance measurement with adjustable parameters is necessary for this.

To this end, use is made of a test installation and a plurality of load generators which generate a load which is similar to the planned application even though it is synthetic. It is thus possible to test whether the planned system can cope with a predetermined load situation.

It is, of course, the aim of a performance measurement to supplement this purely binary indication by obtaining information by means of quantitative indications, regarding the load profile, in particular the simultaneously active number of loads simulated by load generators, which utilizes a predetermined system to capacity. What becomes evident as a result, in particular, is the load which the system can cope with in addition to the specified load.

A first solution is to start up a number of load generators jointly and activate them successively until the loading limit is reached. However, it has turned out that the figures obtained by this means have resulted in incorrectly dimensioned systems. To date, this has been attributed to the fact that the load generators are just not realistic enough, and the performance figures obtained have been correspondingly corrected by estimation.

However, it has emerged that load generators are fully suitable for carrying out precise, realistic and comparable performance measurement if the method according to the invention is used to determine the performance figures.

SUMMARY OF THE INVENTION

The invention consists in first of all activating all of the load generators to produce an overload situation. After this, a plurality of load generators, preferably five, are in each case simultaneously deactivated until the overload situation disappears. After this, individual load generators are successively reactivated. As soon as the overload situation reappears the number of load generators before this point is the measure of the performance of the computer system with regard to the load profile defined by the load generators. The clients deactivated in the respective previous step are at the same time completely disconnected when further clients are deactivated.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
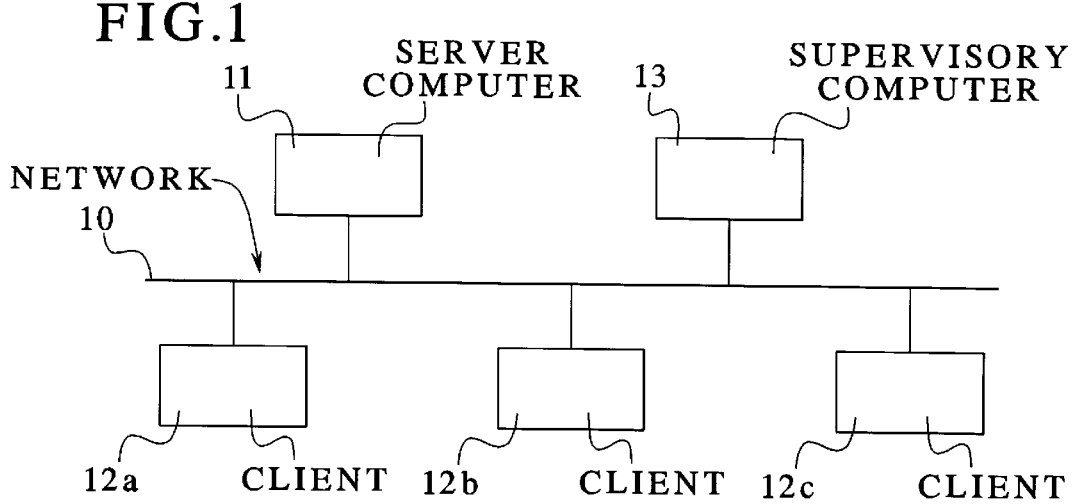
FIG. 1 shows a block diagram of a measuring arrangement.

FIG. 1 shows a block diagram for performance measurement of client/server installations. A network 10, for example Ethernet or Token Ring, connects different computers. A computer 11 designated as the server is the computer to be surveyed, the intention being to determine its performance figure. For this purpose, further computers 12a, 12b and 12c, called clients, are connected to the network in such a way that they can communicate with the server. The number of clients is usually considerably larger than the number shown and can amount to two hundred or more in the case of very high-performance servers or in the case of a plurality of servers. A server can operate clients even in a plurality of different networks. The server is generally operated with a time-sharing operating system. The latter are sold under different trademarks which usually end in "x" or "ix". The clients are mainly personal computers which are operated by means of a suitable operating system for individual users, which is predominantly called DOS. The communication between the client and the server takes place via network protocols, of which TCP/IP and UDP/IP are known and documented in the RFC documents, of which some versions are printed in the DDN Protocol Handbook.

Furthermore, there is a supervisory computer 13, which can determine the respective operating state of the server or of the clients and controls the clients in a manner to be described in more detail. This takes place, for example, by means of communication via manipulations of files on a server which are processed simultaneously by the client and the supervisory computer. Instead of one server, it is also possible, of course, to operate a plurality of servers in parallel.

The performance figure to be determined is intended to specify how many clients can be operated by a server under given boundary conditions. The boundary conditions are stipulated by determining a number of elementary operations. If use is made, for example, of a remote file system such as NFS (Network File System), which for its part uses the UDP/IP protocol, then a possible list of elementary operations comprises: open file, create file, write 1 k of bytes to the file, read 1 k of bytes from the file, position in the file, close file, delete file. For each of these elementary operations, the frequency at which they are to be selected is specified. For example, 5% open file, 60% read, 30% write and 5% close. Moreover, an upper limit is predetermined for the time which the processing of a likewise specified number of elementary operations should not exceed. For example, 1000 operations selected randomly at the said probability should be able to be concluded in a predetermined nominal time of, for example, 100 seconds. If only 25 seconds are required for this, then a load factor of 25% exists for this client. If 120 seconds are required for this, then a load factor of 120%, and an overload situation, exists. A repetition rate is furthermore predetermined, its period time of, for example, 200 seconds being more than the nominal time. The client is inactive during the time remaining between the nominal time or actual execution time and the end of the repetition period. This models the reaction and processing time of a user.

The total load factor of the server is formed from the load factors of the clients as an arithmetic or geometric mean, median or maximum.

In order to measure the total load factor, in a first operating method the system can as a whole be started up such that the server 11 waits for jobs and the clients 12a . . . c are operationally available and logged on, that is to say communicate with the supervisory computer 13 but do not execute any load profiles yet. The supervisory computer successively gives, to a further client each time, the job of executing the predetermined load profile and reporting back the load factor, and from this it determines the load factor of the server. However, the figures determined in this way have proved in practice to be suboptimal in that they misleadingly represent an excessively high load.

Figure 2:
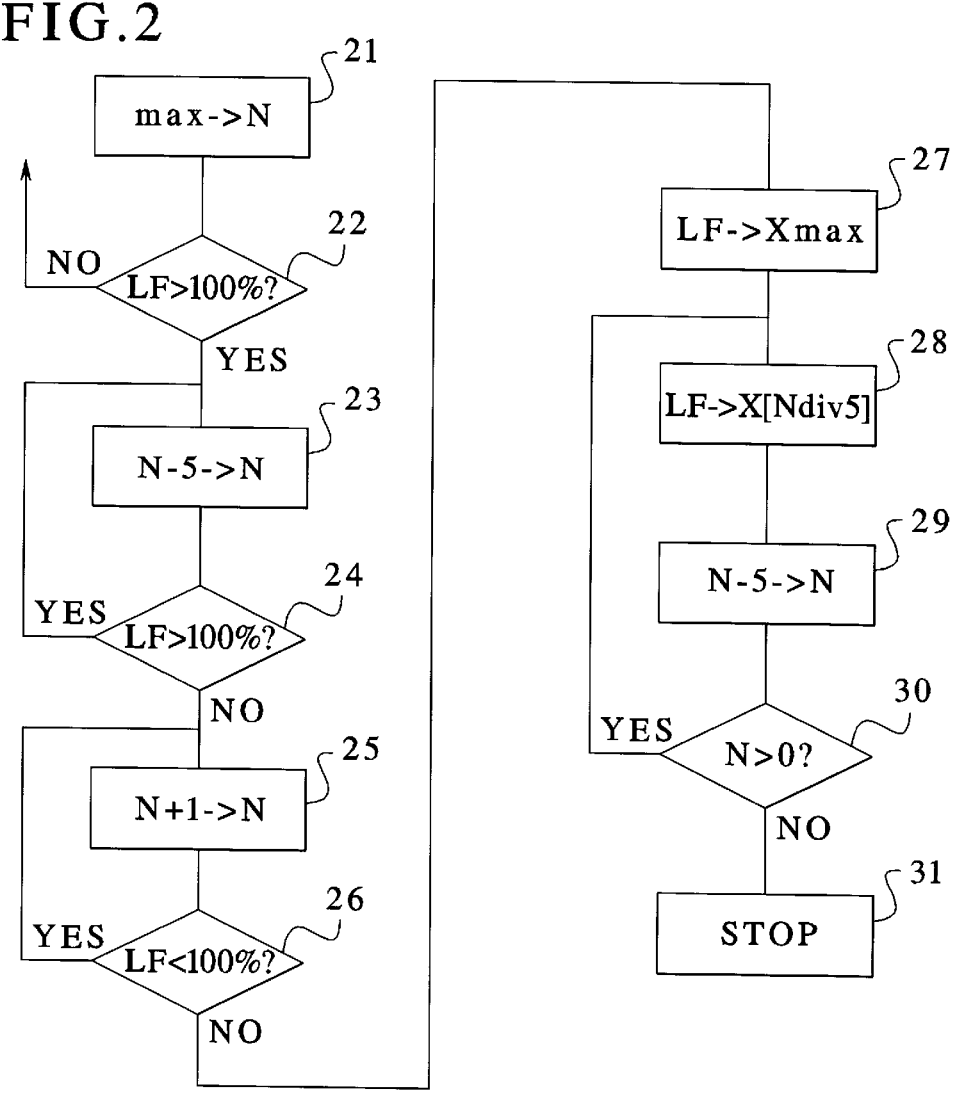
FIG. 2 shows a flow diagram of the sequence of events in the method.

A substantial improvement could be achieved by the method outlined in FIG. 2. The measurement is started in step 21 such that all of the clients are activated. As a result, a total load factor of the server(s) of above 100% is achieved and is tested in step 22. In step 23, the supervisory computer now reduces the number of clients by deactivating a plurality of them simultaneously. A figure of five for this decrement has been found to be optimal. In this case, a distinction is made between two stages of inactivity: pausing and disconnection. In the case of pausing, only the execution of the load profile is halted; the program simulating the load remains connected, however, to the server and supervisory computer via the network. In the case of disconnection, the program simulating the load is completely terminated; the client is effectively isolated from the network. In the reduction of the number of clients in step 23, the procedure is in two stages insofar as each client is first of all only paused and is disconnected if, starting at the second pass, the number of pausing clients exceeds the decrement.

If in this way the total load factor is found to be less than 100%, in step 24, then the pausing clients are successively and individually reactivated in step 25 and thus, by means of the interrogation 26, the number of clients is determined for 100% total load factor, which is stored in step 27 in the variable Xmax.

In order to obtain more data material for comparisons, further measurements are subsequently carried out. For this purpose, clients are first of all deactivated until the number of remaining clients is a multiple of the decrement and the total performance figure is measured. After this, the number of clients which is determined by the decrement are disconnected in each case, and the performance figure is determined, thereby producing a performance curve having a number, determined by the decrement, of interpolation points which as a result can be compared well given different configurations. This takes place in steps 28 to 31.

An extension of the method proceeds, after the determination of the performance figure at 100%, in such a way that the clients are successively paused and deactivated as soon as the number of pausing clients drops below the decrement. Therefore, the number of clients which corresponds to the decrement is always kept in the paused state and the further procedure is always such that a client is paused and a pausing client is simultaneously disconnected.

As an alternative, the number of non-disconnected clients is always maintained as a multiple of the decrement. Given a decrement of five, therefore, clients are individually paused one after the other and, after five have paused, these five are deactivated. This produces a characteristic curve from which it is possible to see the loading of the configuration by pausing clients.

It is possible that, at the beginning of the measurement when all of the clients are activated, an overload cannot be achieved. If possible, further clients are then added.

As an alternative to this, however, it is also possible to model a larger number of clients without the predetermined load profile having to be modified. For this purpose, at the instruction of the supervisory computer, the repetition period is shortened by a factor specified on the supervisory computer, until an overload of the server(s) is achieved. In this way, it is possible to measure the performance limit of a configuration without the number of clients which corresponds to the performance limit having to be physically present. Referring to the example, the repetition period of 200 seconds is reduced to 180 seconds. If 50 clients physically exist, then the load corresponds to that of 55 clients. For the measurements by means of deactivating clients, the repetition period is then initially increased by a factor which corresponds to the desired number of logical clients. In the example, therefore, the first step is to reestablish the original repetition rate, which is then reduced again in steps in 5 seconds, until the overload is reached. If the original repetition period is reached, the procedure is of the type described above.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for operating computers in order to determine a performance figure of a server which provides a computer performance, the server providing this performance by executing jobs, contained in a predetermined load profile, of a plurality of clients which utilize the performance, having measuring means for determining a total load factor, comprising the steps of:
   a) activating all of the clients with a common predetermined load profile, with a result that a total load factor is greater than 100%;
   b) simultaneous deactivation of a number, prescribed by a decrement factor n, of clients, where n>1, and optional repetition of this step, until the total load factor is less than 100%; and
   c) successive reactivation of deactivated clients by a number m, where m<n, until the total load factor once more exceeds 100% the number of clients determined in this way being a measured performance figure of the server with regard to the load profile.

2. A method for operating computers in order to determine a performance figure of a server which provides a computer performance, the server providing this performance by executing jobs, contained in a predetermined load profile, of a plurality of clients which utilize the performance, having measuring means for determining a total load factor, comprising the steps of:
   a) activating all of the clients with a common predetermined load profile, with a result that a total load factor is greater than 100%:
   b) simultaneous deactivation of a number, prescribed by a decrement factor n, of clients, where n>1, and optional repetition of this step, until the total load factor is less than 100%.
   b1) a first deactivation of a client leads to pausing, where execution of the load profile in the pausing client is halted, without logging off the paused client from a network;
   b2) a second deactivation of a client leads to disconnection, where a program for executing the load profile is terminated and network connections are logged off;

b3) if the number of pausing clients exceeds the decrement factor, a corresponding number of clients are disconnected, with the result that the number of pausing clients is not greater than the decrement factor; and c) successive reactivation of deactivated clients until the total load factor once more exceeds 100% the number of clients determined in this way being a measured performance figure of the server with regard to the load profile.

3. The method according to claim 2, wherein, after determination of the performance figure for a total load factor of 100%, further total load factors are determined by deactivating clients, a number of clients, which is determined by the decrement factor, being disconnected simultaneously, and the number of active clients always being a multiple of the decrement factor.

4. The method according to claim 2, wherein, after determination of the performance figure for a total load factor of 100%, further total load factors are determined by deactivating clients, individual clients being paused successively and, by disconnection, the number of pausing clients always being kept equal to the decrement factor.

5. A method for operating computers in order to determine a performance figure of a server which provides a computer performance, the server providing this performance by executing jobs, contained in a predetermined load profile, of a plurality of clients which utilize the performance, having measuring means for determining a total load factor, comprising the steps of:

a) activating all of the clients with a common predetermined load profile, with a result that a total load factor is greater than 100%; the load profiles being composed of phases which generate load and waiting phases, and, when it is not possible to achieve a total load factor of over 100%, the waiting phases being reduced until the total load factor exceeds 100%;

b) simultaneous deactivation of a number, prescribed by a decrement factor n, of clients, where n>1, and optional repetition of this step, until the total load factor is less than 100%; and c) successive reactivation of deactivated clients, until the total load factor once more exceeds 100%, the number of clients determined in this way being a measured performance figure of the server with regard to the load profile.

* * * * *